US011555769B2

United States Patent
Casey et al.

(10) Patent No.: US 11,555,769 B2
(45) Date of Patent: Jan. 17, 2023

(54) SPOOL BODY FOR A VIBRATING DENSITOMETER

(71) Applicant: Micro Motion, Inc., Boulder, CO (US)

(72) Inventors: Megan Casey, Boulder, CO (US); Anthony William Pankratz, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 136 days.

(21) Appl. No.: 15/568,065

(22) PCT Filed: May 18, 2015

(86) PCT No.: PCT/US2015/031372
§ 371 (c)(1),
(2) Date: Oct. 20, 2017

(87) PCT Pub. No.: WO2016/186639
PCT Pub. Date: Nov. 24, 2016

(65) Prior Publication Data
US 2018/0120210 A1    May 3, 2018

(51) Int. Cl.
*G01N 9/00* (2006.01)
*G01N 11/16* (2006.01)

(52) U.S. Cl.
CPC .............. *G01N 9/002* (2013.01); *G01N 11/16* (2013.01); *G01N 2009/006* (2013.01)

(58) Field of Classification Search
CPC ... G01N 9/002; G01N 11/16; G01N 2009/006
USPC ........................................................ 73/32 A
See application file for complete search history.

(56) References Cited

U.S. PATENT DOCUMENTS

| 2,943,476 A | * | 7/1960 | Bernstein | G01N 9/002 73/32 A |
| 3,572,094 A | * | 3/1971 | Banks | G01N 9/002 73/24.05 |
| 3,955,401 A | * | 5/1976 | Catherall | G01N 9/002 73/32 A |
| 4,007,627 A | * | 2/1977 | Stansfeld | G01N 9/002 73/32 A |

(Continued)

FOREIGN PATENT DOCUMENTS

| DE | 102005053331 A1 | * | 5/2007 | ......... G01F 23/2966 |
| DE | 102005053331 A1 |   | 5/2007 | |

(Continued)

OTHER PUBLICATIONS

Micheal Pecht et al., Characterization Of Some Commercial Thermaly-Cured Potting Materials, IEEE, CALCE Electronic Products and Systems Center, 0-7803-9853-X/03 (Year: 2003).*

(Continued)

*Primary Examiner* — Marrit Eyassu
(74) *Attorney, Agent, or Firm* — The Ollila Law Group LLC

(57) ABSTRACT

A spool body is provided that is adapted for use in a vibrating densitometer. The spool body comprises a core and a plurality of spines that emanate distally from the core. At least one channel is defined by the plurality of spines, wherein a cantilever mode of the spool body lies outside a predetermined natural frequency range of a vibrating tube portion of the vibrating densitometer.

20 Claims, 8 Drawing Sheets

(56) References Cited

U.S. PATENT DOCUMENTS

| | | | | |
|---|---|---|---|---|
| 5,373,745 | A | * | 12/1994 | Cage .................... G01F 1/8409 |
| | | | | 73/861.18 |
| 5,710,374 | A | * | 1/1998 | Ross ..................... G01N 11/16 |
| | | | | 73/54.24 |
| 5,731,527 | A | * | 3/1998 | Van Cleve ........... G01F 1/8477 |
| | | | | 138/DIG. 2 |
| 6,006,609 | A | | 12/1999 | Drahm et al. |
| 6,330,831 | B1 | * | 12/2001 | Lynnworth ............ G01F 1/662 |
| | | | | 73/861.28 |
| 2004/0255648 | A1 | | 12/2004 | Sparks |
| 2005/0034535 | A1 | * | 2/2005 | Sprague ................ G01F 1/3209 |
| | | | | 73/861.22 |
| 2007/0234822 | A1 | * | 10/2007 | Bitto .................... G01F 1/8409 |
| | | | | 73/861.355 |
| 2007/0277624 | A1 | * | 12/2007 | Rieder .................. G01F 1/8409 |
| | | | | 73/861.357 |
| 2009/0173169 | A1 | | 7/2009 | Bitto et al. |
| 2010/0304152 | A1 | * | 12/2010 | Clarke .................... C08L 83/04 |
| | | | | 428/438 |
| 2011/0061451 | A1 | * | 3/2011 | Harris ................... G01N 11/10 |
| | | | | 73/54.42 |
| 2013/0133418 | A1 | | 5/2013 | Van Cleve et al. |
| 2015/0082873 | A1 | * | 3/2015 | Goodbread ........... G01N 11/16 |
| | | | | 73/54.41 |
| 2018/0113014 | A1 | * | 4/2018 | Singer ..................... G01L 1/242 |

FOREIGN PATENT DOCUMENTS

| | | |
|---|---|---|
| WO | 2014051574 A1 | 4/2014 |
| WO | 2014163642 A1 | 10/2014 |

OTHER PUBLICATIONS

W. E. Tefft et al., A Comparision of Exmerimental and Theoretical Relations Between Yong's Modulus and the Flexural and Longitudinal Resonance Frequencies of Uniform Bars, Dec. 17, 1959, Journal of Research of the National Bureau of Standards, vol. 64A, No. 2 (Year: 1959).*

* cited by examiner

SPOOL BODY FOR A VIBRATING DENSITOMETER

FIELD OF THE INVENTION

The present invention relates to a vibrating densitometer, and more particularly, to a spool body of a vibrating densitometer.

BACKGROUND OF THE INVENTION

Densitometers are generally known in the art and may be used to measure a density of a fluid. The fluid may comprise a liquid, a gas, a liquid with suspended particulates and/or entrained gas, or combinations thereof.

Vibrating densitometers can comprise a vibrating member, such as a cylinder that is exposed to a fluid under test. One example of a vibrating densitometer comprises a cylindrical conduit that is cantilever-mounted, with an inlet end coupled to an existing pipeline or other structure and with the outlet end free to vibrate. The conduit can be vibrated and a resonant frequency can be measured. As is generally known in the art, the density of the fluid under test can be determined by measuring a resonant frequency of the conduit in the presence of the fluid. According to well-known principles, the resonant frequency of the conduit will vary inversely with the density of the fluid in contact with the conduit.

FIG. 1 illustrates a prior art densitometer. The prior art densitometer includes a cylindrical vibrating member located at least partially within a housing. The housing or the vibrating member may include flanges or other members for operatively coupling the densitometer to a pipeline or similar fluid delivering device in a fluid-tight manner. In the example shown, the vibrating member is cantilever mounted to the housing at an inlet end. The opposite end is free to vibrate. The vibrating member includes a plurality of fluid apertures that allow fluid to enter the densitometer and flow between the housing and the vibrating member. Therefore, the fluid contacts the inside as well as the outside surfaces of the vibrating member. This is particularly helpful when the fluid under test comprises a gas, as a greater surface area is exposed to the gas. In other examples, apertures may be provided in the housing and the vibrating member apertures may not be required.

The vibrating member may be vibrated at or near to a natural (i.e., resonant) frequency. As noted, by measuring a resonant frequency of the member in a presence of a fluid, the density of the fluid can be determined.

A driver and a vibration sensor are positioned on a spool body inside or outside of the cylinder. The driver receives a drive signal from a meter electronics and vibrates the vibrating member at or near a resonant frequency. The vibration sensor detects the vibration of the vibrating member and sends the vibration information to the meter electronics for processing. The meter electronics determines the resonant frequency of the vibrating member/test fluid and generates a density measurement from the measured resonant frequency.

To obtain accurate density measurements, the resonant frequency must be very stable. Unfortunately, vibrating densitometers often experience a series of v-like dips in the response to a sensor operated over a range of gas pressures. This is illustrated in the graph of FIG. 2. The spool body with the cylinder has a cantilever mode that may be excited during the normal operation of the densitometer, but the frequency that excites this cantilever mode is inconsistent between spool bodies. A key design criterion for a gas density cylinder is the separation of the vibration mode shapes so that they may be easily and accurately discriminated. It should be noted, however, that the spool body cantilever mode can unpredictably appear between 1100-1700 Hz, which is within the range of a typical vibrating densitometer's expected measuring range, thus impacting the accuracy of measurements. It is hypothesized that the variation in frequencies is due to the inconsistency related to potting material around the spool bodies, as the potting process is not precise and prone to void formation. FIG. 3 illustrates a potting void in a prior art spool body.

As a result, prior art vibrating densitometers may generate a resonant frequency value that incorporates an unpredictable spool body cantilever mode, introducing errors into density measurements.

Therefore, there exists a need to remove the spool body cantilever mode from the vibrating member's natural frequency range. There exists a need for a spool body exhibiting an increased or decreased natural frequency, yet still maintain a small footprint that is compatible with densitometer form factors. There also exists a need for a spool body that is less prone to forming potting voids. The present invention addresses these and other needs, and an advance in the art is achieved.

SUMMARY

A spool body adapted for use in a vibrating densitometer is provided. The spool body comprises a core, a plurality of spines emanating distally from the core, and at least one channel defined by the plurality of spines.

A method of forming a vibrating densitometer is provided. The method comprises providing a vibrating tube portion having a predetermined natural frequency range and forming a spool body having a cantilever mode comprising a frequency range that is outside the predetermined natural frequency range of the vibrating tube portion.

ASPECTS

In one aspect of the invention, a vibrating member for use in a vibrating densitometer comprises a spool body adapted for use in a vibrating densitometer. The spool body comprises a core and a plurality of spines emanating distally from the core, wherein at least one channel is defined by the plurality of spines.

Preferably, a cantilever mode of the spool body lies outside a range of between about 770 Hz and 4080 Hz.

Preferably, a cantilever mode of the spool body lies outside a range of between about 900 Hz and 2000 Hz.

Preferably, at least one channel comprises a filler material therein.

Preferably, the spool body material comprises a potting.

Preferably, the potting comprises a fiber.

Preferably, the spool body material comprises a plastic.

Preferably, the spool body material comprises polyphenylene sulfide.

Preferably, a driver is configured to vibrate the vibrating tube portion with respect to the housing, and at least one vibration sensor is configured to detect vibrations of the vibrating tube portion.

Preferably, the vibrating tube portion is included at least partially within a vibrating member of a vibrating densitometer.

Preferably, the plurality of spines and the at least one channel are disposed circumferentially about the core.

Preferably, the plurality of spines and the at least one channel are disposed radially about a longitudinal axis of the core.

In one aspect of the invention, a method of forming a vibrating densitometer comprises: providing a vibrating tube portion having a predetermined natural frequency range, and forming a spool body having a cantilever mode comprising a frequency range that is outside the predetermined natural frequency range of the vibrating tube portion.

Preferably, the step of forming the spool body comprises: forming a core; forming a plurality of spines that emanate distally from the core; and forming at least one channel defined by the plurality of spines.

Preferably, the predetermined natural frequency range is between about 770 Hz and 4080 Hz.

Preferably, the predetermined natural frequency range is between about 900 Hz and 2000 Hz.

Preferably, the step of forming the spool body comprises placing a filler material in the at least one channel.

Preferably, the spool body material comprises a potting.

Preferably, the potting comprises a fiber.

Preferably, the spool body material comprises a plastic.

Preferably, the spool body material comprises polyphenylene sulfide.

Preferably, the step of forming the spool body comprises: placing a driver on the spool body, wherein the driver is configured to vibrate the vibrating tube portion; and placing at least one vibration sensor on the spool body, wherein the at least one vibration sensor is configured to detect vibrations of the vibrating tube portion.

Preferably, the method of forming a vibrating densitometer comprises the step of placing the vibrating tube portion at least partially within a vibrating member of the vibrating densitometer.

Preferably, the plurality of spines and the at least one channel are disposed circumferentially about the core.

Preferably, the plurality of spines and the at least one channel are disposed radially about a longitudinal axis of the core.

DESCRIPTION OF THE DRAWINGS

The same reference number represents the same element on all drawings. The drawings are not necessarily to scale.

DETAILED DESCRIPTION OF THE INVENTION

FIGS. 4-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

As noted above, a vibrating member for a densitometer changes its natural frequency depending on the density of the fluid it is measuring. In the case of a typical gas density meter, for example without limitation, the vibrating member's operating frequency range is between approximately 900 Hz and 2000 Hz. Prior art spool bodies exhibit a cantilever mode that is within this range, so therefore provide a source of error when attempting to measure a fluid's density.

Figure 4:
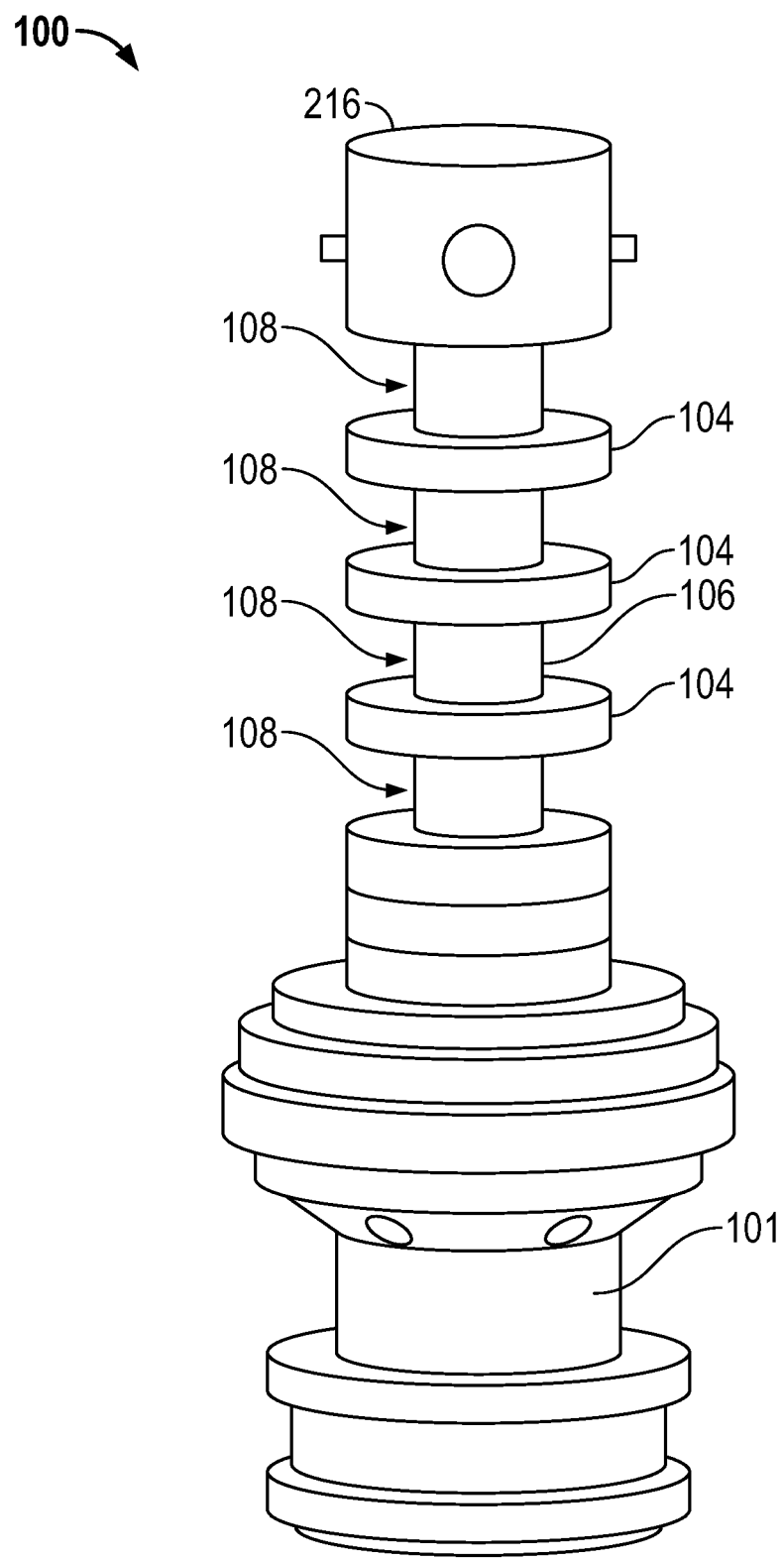
FIG. 4 shows a spool body according to an embodiment with no potting yet installed.
Figure 5:
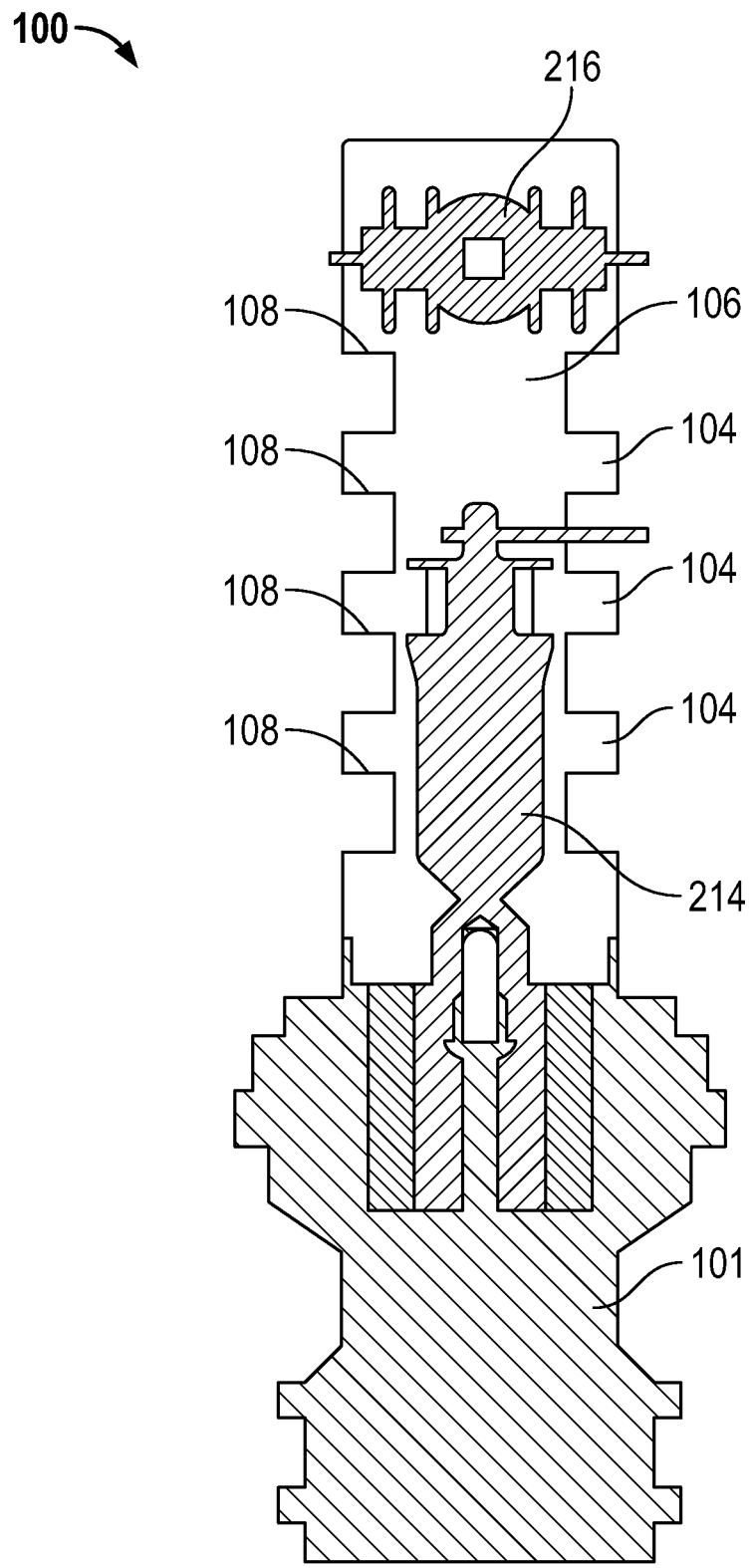
FIG. 5 shows a cross section of a spool body according to an embodiment having potting.

FIGS. 4 and 5 illustrate a spool body 100 according to embodiments. For clarity, FIG. 4 is illustrated with no potting installed. This spool body 100 shifts the cantilever mode away from the operating mode of the vibrating member, and thus improves the accuracy of the density meter in which it may be installed. In an embodiment, the cantilever mode is shifted to a frequency that is higher than the operating range of the vibrating member so that there are no conflicting modes. In another embodiment, the cantilever mode is shifted to a frequency that is lower than the operating range of the vibrating member so that there are no conflicting modes. The spool body 100 exhibits other modes besides the cantilever mode, which are higher than the cantilever mode and in an embodiment, the cantilever mode is shifted to a frequency that is lower than the operating range of the vibrating member, with the next highest mode of the spool body being higher than the operating range of the vibrating member.

As an example, it is well-known that frequency is dependent on the mass and stiffness of an object as shown in equation (1):

$$f \propto \sqrt{\frac{k}{m}} \quad (1)$$

Where:

f is frequency;

k is stiffness; and m is mass.

This is merely an example of an application of an equation, and does not serve to limit the embodiments, for other equations are contemplated. However, the relationships expressed by equation (1) indicate that to increase the natural frequency of the spool body 100, its mass must be lowered, its stiffness must increase, or both. An embodiment provided reduces the mass of the spool body 100 by using less potting 102. An embodiment reduces the mass of the spool body 100 by using potting 102 having a relatively low density. It should be noted that it is contemplated to reduce the mass of the components embedded in the potting 102, however, the mass of these components is relatively large compared to the mass of the potting, such that relatively small effects are possible. Therefore, in an embodiment, the stiffness of the spool body 100 is increased in order to raise the cantilever mode frequency. In related embodiments, the stiffness of the spool body 100 is decreased in order to lower the cantilever mode frequency. It should be noted that adjusting the mass of the spool body 100 may adjust the stiffness thereof, so frequency changes based on mass or mass allocation changes may be partially offset by changes in stiffness.

An example of an equation used to define stiffness (k) for the spool body's 100 cantilever mode is exemplified by equation (2):

$$k = \frac{3EI}{L^3} \quad (2)$$

Where:
E is the modulus of elasticity of the material;
I is the moment of inertia of the object; and
L is the length.

This is merely an example of an application of an equation, and does not serve to limit the embodiments, for other equations are also contemplated. Since adjusting the length of the spool body 100 relates to the length of the vibrating member, the cavity in which the spool body 100 resides, and the configuration of any drive circuit, this is a relatively cumbersome variable to alter. However in an embodiment, the length of the spool body 100 is either shortened or lengthened to achieve a desired frequency response.

By adjusting the moment of inertia, it is possible in embodiments that all the spool body 100 modes remain outside the operating frequency range of the sensor. Thus the klm ratio (see equation (1) for example) can be adjusted to place all bending, radial, and breathing modes outside the sensor's operating range, which as already noted, is generally between about 900 to 2000 Hz. In an embodiment, the operating range is between about 500 and 2500 Hz. These are only example frequency ranges, and may be different for other cylinder materials or shapes.

The modulus of elasticity and/or moment of inertia are adjusted in embodiments. The moment of inertia (I) is already largely ideal with a circular cross-section, and can be expressed as in equation (3):

$$I = \frac{\pi r^4}{4} \quad (3)$$

Where:
r is the radius of the spool body.

This is merely an example of an application of an equation, and does not serve to limit the embodiments, for other equations are also contemplated. Changing the moment of inertia relates to increasing or decreasing the radius of the potting 102. According to experiments conducted, it was determined that the moment of inertia would have to increase by approximately 112% in order to move the cantilever mode high enough so that it was outside the normal operating range, which relates to the radius of the potted section increasing to a degree which is not practical in some embodiments, as this may interfere with the vibrating member. However, in some embodiments, the radius of the potted section is increased so to adjust the moment of inertia.

Figure 8:
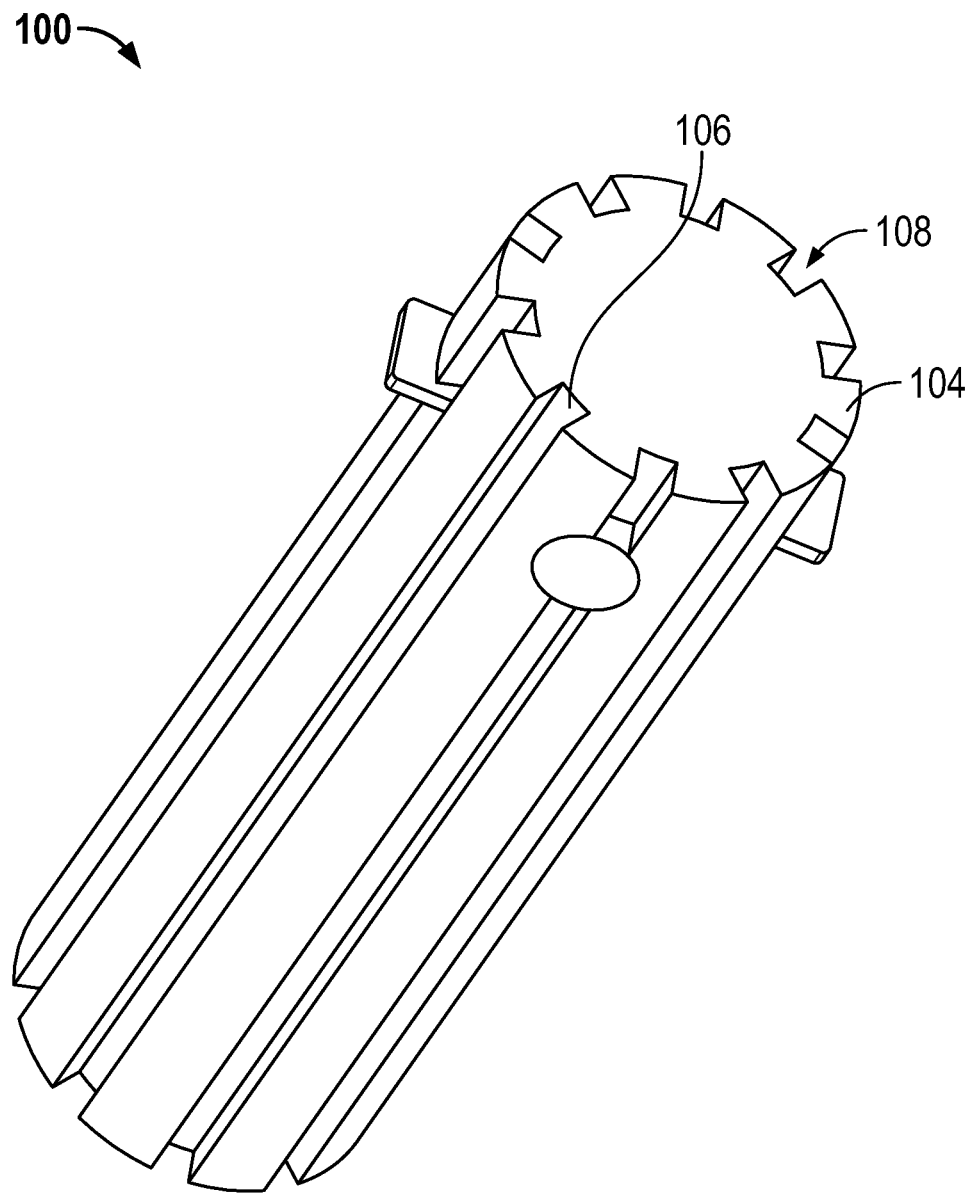
FIG. 8 shows a spool body according to an embodiment.

In an embodiment, the cantilever mode is decreased, which concomitantly results in a decrease in the moment of inertia, by shrinking the cross section of the spool body 100. However, since just shrinking the cross section results in a mass reduction, this cancels out much of the frequency change that result from changing the moment of inertia. In an embodiment, as pictured in FIGS. 4 and 5, forming the spool body 100 such that a plurality of spines 104 emanate distally from a core 106, results in a lower moment of inertia, yet maintains a requisite amount of mass. Specifically, the addition of the spines 104 decreases the bending moment of inertia by taking on the characteristics of the thinnest cross section of the core 106, yet maintaining material in the spines 104 keeps the mass relatively high. The plurality of spines 104 effectively defines a series of channels 108. In an embodiment, potting 102 may be placed in the channels 108, however, the channels may also not have any potting therein. A separate base 101 may or may not be present. In an embodiment, the channels 108 and spines 104 are disposed circumferentially about the spool body 100. In an alternate embodiment, as shown in FIG. 8, the channels 108 and spines 104 are disposed radially about a longitudinal axis of the core 106 of the spool body 100.

The shape of the spool body 100 is not limited to a round cross-section, as illustrated. Square, oblong, polygonal, square, triangular, lobular, dog-boned, and other cross-sectional shapes are also contemplated in embodiments.

As stated above, the modulus of elasticity of the potting 102 is also adjusted in an embodiment. In an embodiment, the modulus of elasticity of the spool body 100 is raised by using a potting 102 which has a relatively high modulus of elasticity. In an embodiment, an injected plastic is substituted for potting 102, as plastic generally has a higher modulus than typical potting. In an embodiment, the modulus of elasticity of the spool body 100 is raised by forming the spool body with a material having a relatively high modulus of elasticity. Through the use of injection molding, it is possible to use materials not typically used as a potting material. In an embodiment, a fiber-reinforced plastic is used in place of traditional potting or spool body 100 material. In an embodiment, a polyphenylene sulfide, such as Ryton® is used in place of traditional potting. Polyphenylene sulfide may advantageously be used in high-temperature applications and in corrosive environments. To reinforce the material from which the spool body 100 is constructed, fibers may be added to create a composite material. The fibers contemplated are those made from glass, carbon aramid, boron, alumina, silicon carbide, quartz, other fibers known in the art, and combinations thereof, for example without limitation.

Figure 1:
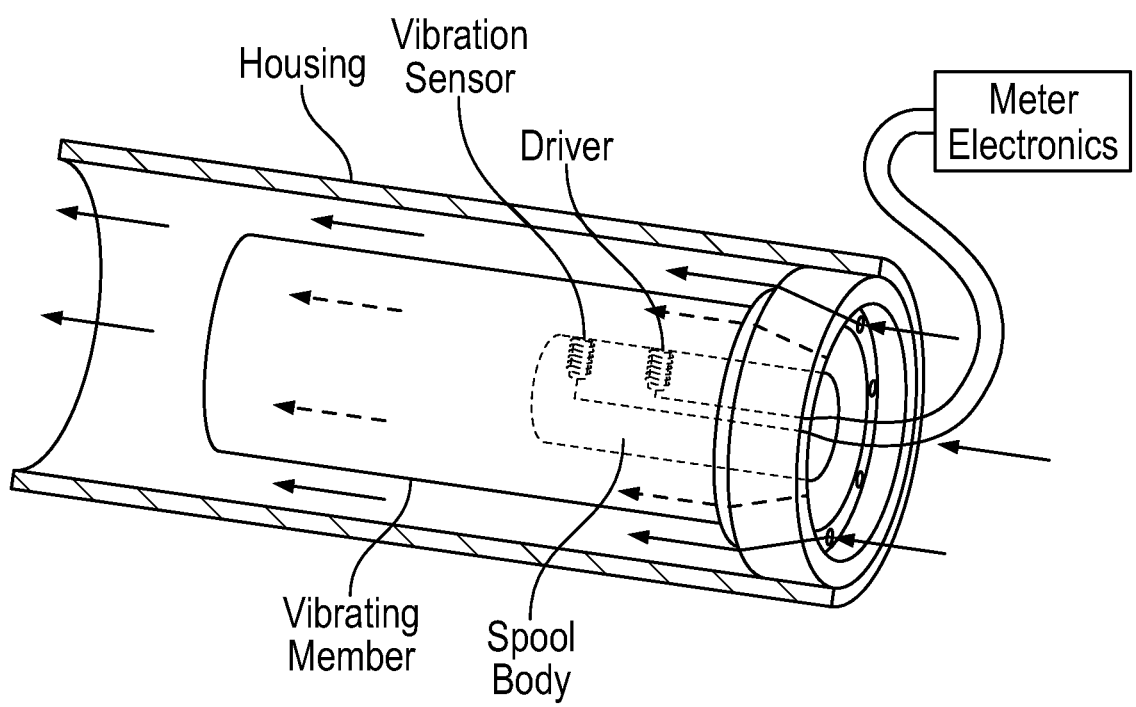
FIG. 1 shows a prior art densitometer.
Figure 2:
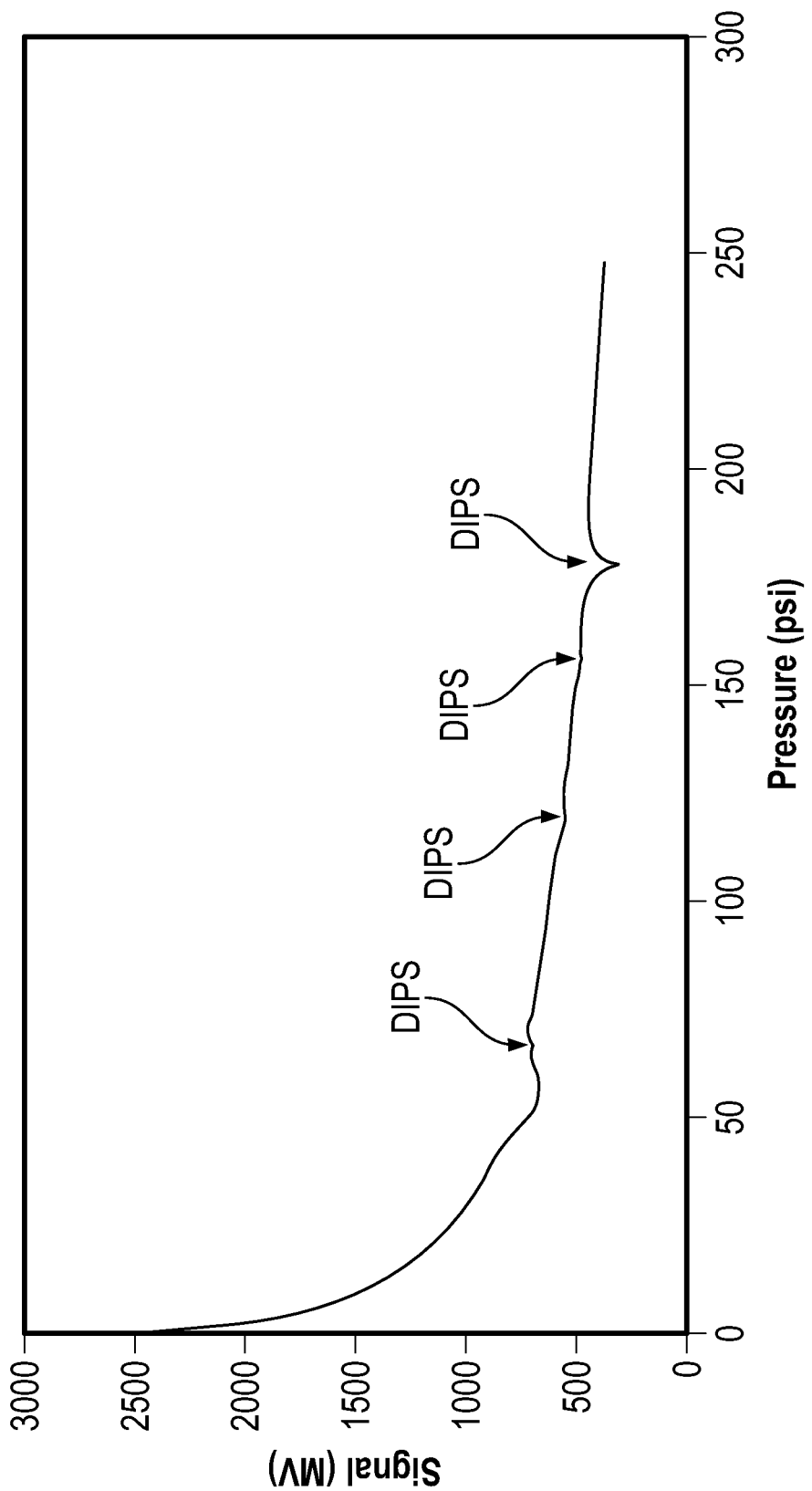
FIG. 2 shows a signal response curve of a prior art densitometer exhibiting dips due at least in part to potting inconsistencies.
Figure 3:
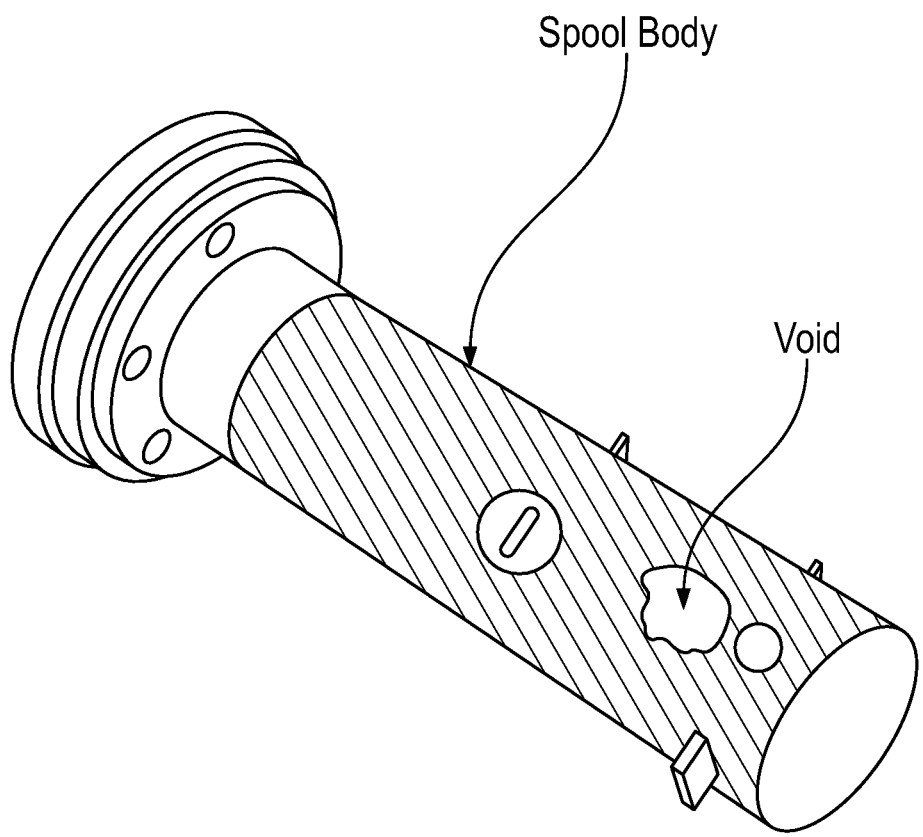
FIG. 3 shows a potting void in a prior art spool body.

The injection molding method is also much less likely to create voids often found in the current spool bodies (see FIG. 3). Besides affecting the spool body movement, voids may expose electronics to potentially corrosive measurement fluids. Voids also result in a costly fallout (defect) rate during manufacture, hence raising the average cost of finished assemblies, while also limiting production. Though polyphenylene sulfide may replace potting, polyphenylene sulfide may also be used for construction of the spool body 100.

Figure 6:
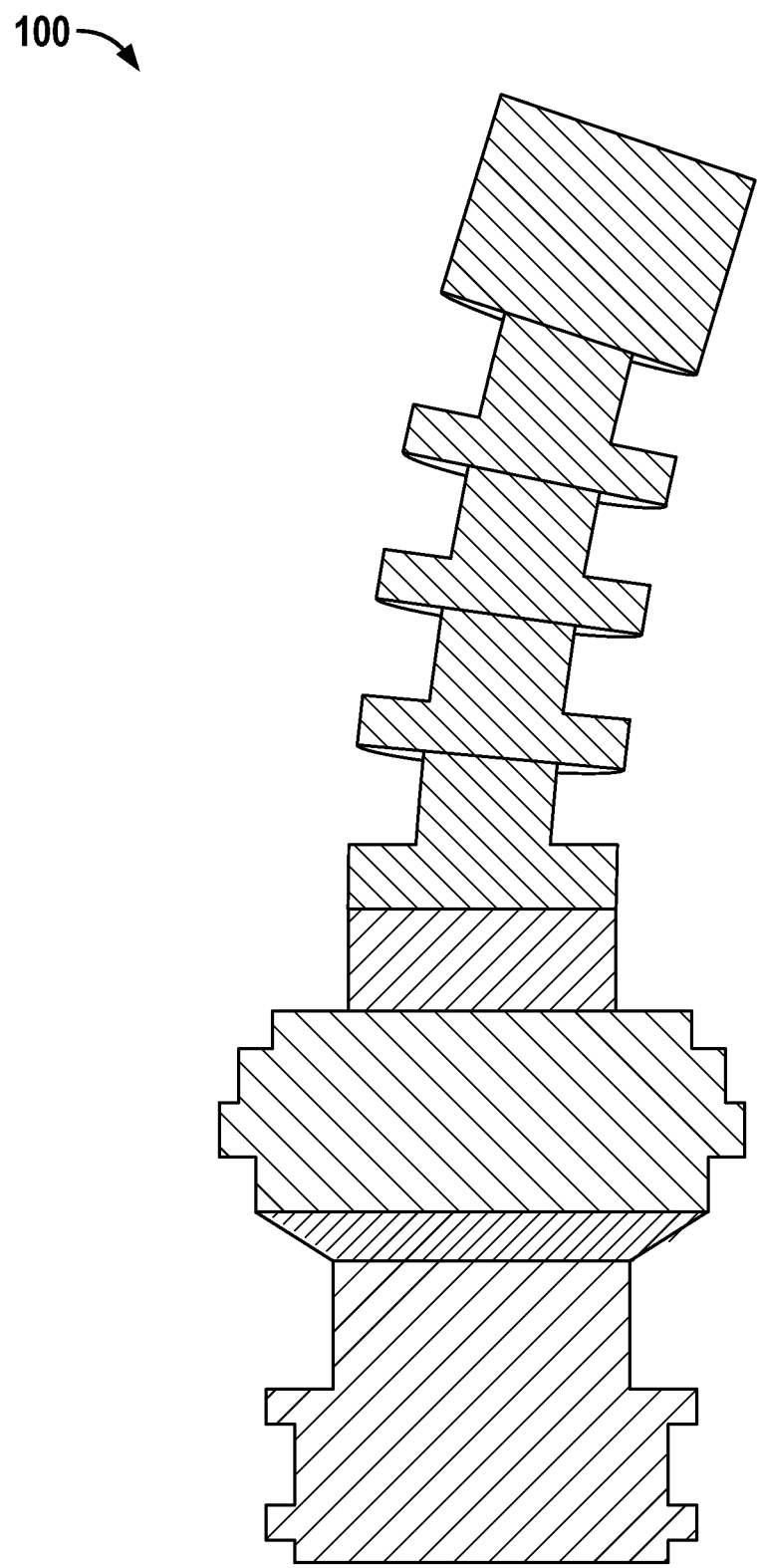
FIG. 6 shows a model of the spool body according to an embodiment illustrating a cantilever mode.

FIG. 6 shows an example finite element analysis model of the spool body 100 according to an embodiment, specifically illustrating a cantilever mode that has been lowered to about 770 Hz, with the next mode not appearing until 4080 Hz. These modes are outside the operating range of most vibrating members, and thus do not interfere with most density measurements.

Figure 7:
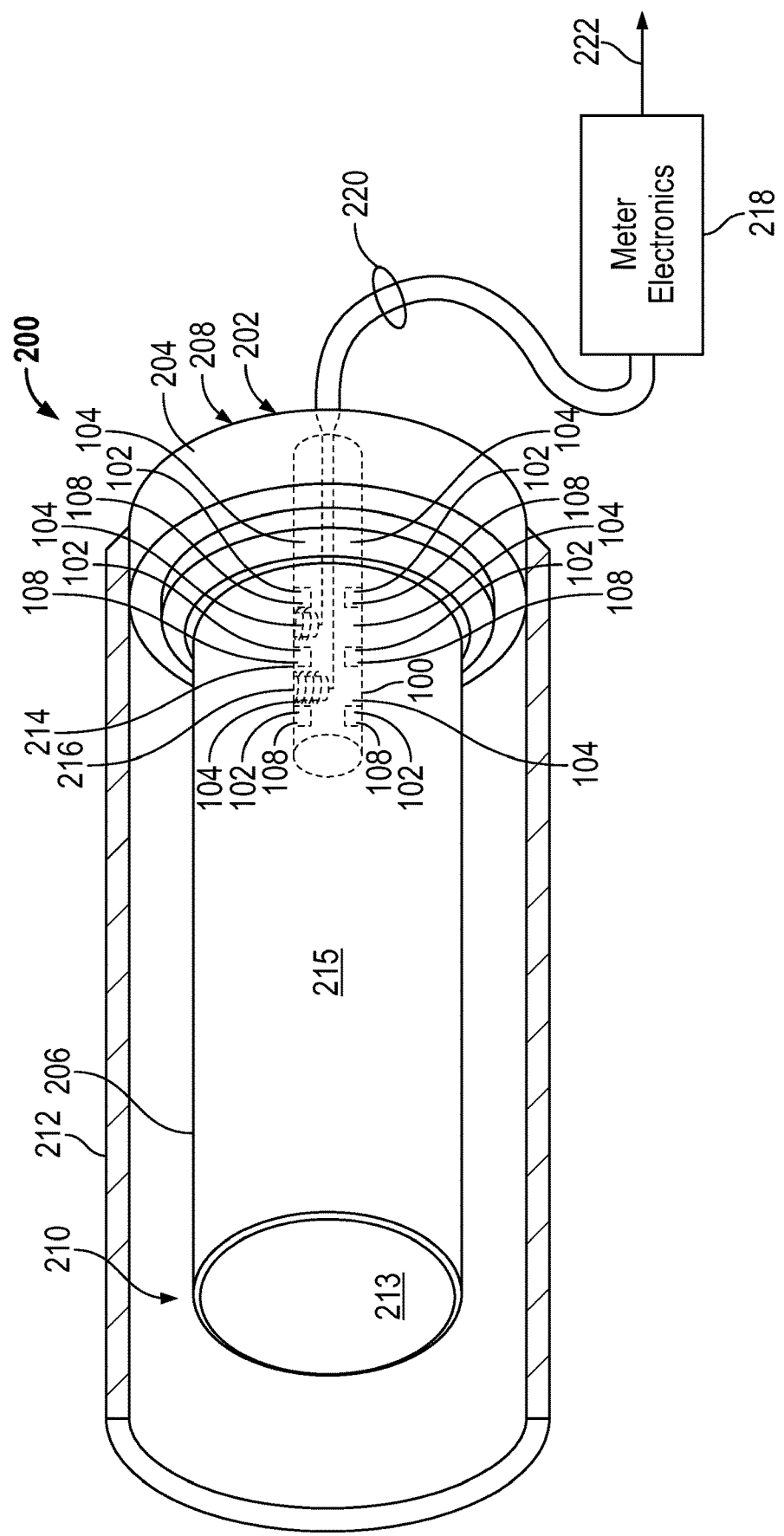
FIG. 7 shows a partial cross section of a densitometer according to an embodiment.

FIG. 7 shows a vibrating densitometer 200 according to an embodiment. A vibrating member 202 in the embodiment shown includes a base 204 and an elongated vibrating tube portion 206 affixed to the base 204. The vibrating member 202 is substantially hollow and includes an inlet end 208 and an outlet end 210. The base 204 is located at the inlet end 208 of the vibrating member 202. The inlet end 208 may be coupled to a housing 212 or other component of the vibrating densitometer 200. Fluid entering or passing through the vibrating member 202 enters at the inlet end 208 and may exit at the outlet end 210. It will be appreciated that in an embodiment, the inlet end 208 may be configured to be an outlet while the outlet end 210 may be configured to be an inlet.

The vibrating tube portion 206 comprises the density-sensing element. The vibrating tube portion 206 may comprise a thin metal tube in some embodiments. In operation, the vibrating tube portion 206 is activated so that it vibrates at its natural (resonant) frequency. The vibrating member 202 (and therefore the vibrating tube portion 206) is configured to be vibrated in one or more vibration modes. In an embodiment, the vibrating member 202 (and therefore the vibrating tube portion 206) is configured to be vibrated in one or more radial vibration modes. A fluid, such as a gas, may be passed over at least one of the inner surface 213 and/or the outer surface 215 of the vibrating tube portion 206, and is therefore in contact with exposed sides of the vibrating tube portion 206. The mass of the fluid vibrates with the tube, and since increasing the vibrating mass decreases the natural frequency of vibration of the vibrating member, the fluid density is determined by measuring the natural or resonant vibration frequency of the vibrating member 202 when the vibrating member 202 is vibrated in the presence of a fluid.

The vibrating densitometer 200 may be configured to determine a density of a fluid, such as a gas, a liquid, a liquid with entrained gas, a liquid with suspended particulates and/or gas, or a combination thereof.

According to an embodiment, the vibrating densitometer 200 includes the vibrating member 202 inside a housing 212. The vibrating member 202 may be permanently or removably affixed to the housing 212. The fluid to be quantified may be introduced into or may be passed through the housing 212. The vibrating member 202 may be substantially coaxial within the housing 212 in some embodiments. However, the vibrating member 202 need not correspond to the housing 212 in cross-sectional shape.

When the vibrating tube portion 206 is installed in the vibrating densitometer 200, the inlet end 208 of the vibrating member 202 is coupled to the housing 212 while the outlet end 210 is free to vibrate. The vibrating tube portion 206 is not directly coupled to the housing 212 in the embodiment shown, but instead the base 204 is coupled to the housing 212 and the outlet end 210 is free to vibrate. As a result, the vibrating tube portion 206 is cantilever-mounted to the housing 212.

According to an embodiment, the vibrating densitometer 200 further includes a driver 214 and at least one vibration sensor 216, which are coupled to the spool body 100. The driver 214 can be adapted to vibrate the vibrating member 202 in one or more vibration modes. While the driver 214 is shown located within the spool body 100 positioned within the vibrating member 202, in some embodiments the driver 214 may be positioned between the housing 212 and the vibrating member 202, for example. Furthermore, it should be appreciated that while the driver 214 is shown positioned closer to the inlet end 208, the driver 214 may be positioned at any desired location. According to an embodiment, the driver 214 can receive an electrical signal from the meter electronics 218 via leads 220.

In the embodiment shown, the at least one vibration sensor 216 is coaxially aligned with the driver 214. In other embodiments, the at least one vibration sensor 216 may be coupled to the vibrating member 202 in other locations. For example, the at least one vibration sensor 216 may be located on an outer surface of the vibrating member 202. Further, the at least one vibration sensor 216 may be located outside the vibrating member 202 while the driver 214 is located inside the vibrating member 202, or vice versa.

The at least one vibration sensor 216 can transmit a signal to the meter electronics 218 via leads 220. The meter electronics 218 can process the signals received by the at least one vibration sensor 216 to determine a resonant frequency of the vibrating member 202. If a fluid under test is present, the resonant frequency of the vibrating member 202 will change inversely proportionally to the fluid density as is known in the art. The proportional change may be determined during an initial calibration, for example. In the embodiment shown, the at least one vibration sensor 216 also comprises a coil. The driver 214 receives a current to induce a vibration in the vibrating member 202, and the at least one vibration sensor 216 uses the motion of the vibrating member 202 created by the driver 214 to induce a voltage. Coil drivers and sensors are well known in the art and a further discussion of their operation is omitted for brevity of the description. Furthermore, it should be appreciated that the driver 214 and the at least one vibration sensor 216 are not limited to coils, but rather may comprise a variety of other well-known vibrating components, such as piezo-electric driver/sensors, laser sensors, etc., for example without limitation. Therefore, the present embodiments should in no way be limited to coils. Furthermore, those skilled in the art will readily recognize that the particular placement of the driver 214 and the at least one vibration sensor 216 can be altered while remaining within the scope of the present embodiments.

The meter electronics 218 may be coupled to a bus 222 or other communication link. The meter electronics 218 may communicate density measurements over the bus 222. In addition, the meter electronics 218 may transmit any manner of other signals, measurements, or data over the bus 222. In addition, the meter electronics 218 may receive instructions, programming, other data, or commands via the bus 222.

In operation, the wall of the vibrating tube portion 206 is excited. In an embodiment, the wall of the vibrating tube portion 206 is excited in a radial direction and in a radial vibration mode by the driver 214 or other excitation mechanism. The wall of the vibrating tube portion 206 will then vibrate in a corresponding radial mode, but at a resonant frequency of the elongated vibrating tube portion 206 and the surrounding flow fluid.

The spool body 100 embodiments provided, allow the vibrating tube portion 206 and the resulting vibration modes to be separated from frequency dips due to the spool body 100 cantilever mode by at least a predetermined frequency difference. Consequently, the vibrating densitometer 200 can filter, or otherwise separate or discriminate, the vibration modes picked up by the at least one vibration sensor 216 from cantilever mode interference.

During construction of the densitometer 200, the spool body 100 is formed. In an embodiment, the spool body 100 is at least partially formed by casting. In an embodiment, the spool body 100 is at least partially formed by machining. In an embodiment, the spool body 100 is at least partially formed by electrical discharge machining. These provide non-limiting examples of potential construction techniques, and do not serve to limit the use of other construction techniques. The spool body 100 may be constructed from metal, plastic, polymer, composite, and combinations thereof. The spool body 100 need not be formed from a single material, and may comprise portions made from a first material, and other portions made from at least a second material. Potting 102 may, in some embodiments, be cast, injected, or otherwise introduced into the channels 108 of the spool body 100.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibrating members, and not just to the embodiments described above and shown in the accompanying figures. Accordingly, the scope of the embodiments described above should be determined from the following claims.

What is claimed is:

1. A spool body (100) for use in a vibrating densitometer (200), with the spool body (100) comprising:
   a core (106); and
   a plurality of spines (104) emanating distally from the core (106);
   at least one channel (108) defined by the plurality of spines (104):
   wherein the at least one channel (108) comprises a potting therein, wherein the potting couples at least two spines of the plurality of spines, and wherein the potting placed in the at least one channel adjusts the modulus of elasticity of the spool body without altering the plurality of spines.

2. The spool body (100) of claim 1, wherein a cantilever mode of the spool body lies outside a range of between about 770 Hz and 4080 Hz.

3. The spool body (100) of claim 1, wherein a cantilever mode of the spool body lies outside a range of between about 900 Hz and 2000 Hz.

4. The spool body (100) of claim 1, wherein the potting (102) comprises a fiber.

5. The spool body (100) of claim 1, wherein the potting comprises a plastic.

6. The spool body (100) of claim 1, wherein the potting comprises polyphenylene sulfide.

7. The spool body (100) of claim 1, comprising:
   a driver (214) configured to vibrate a vibrating tube portion (206) with respect to a housing (212); and
   at least one vibration sensor (216) configured to detect vibrations of the vibrating tube portion (206).

8. The spool body (100) of claim 1, wherein a vibrating tube portion (206) is included at least partially within a vibrating member (202) of a vibrating densitometer (200).

9. The spool body (100) of claim 1, wherein the plurality of spines (104) and the at least one channel (108) are disposed circumferentially about the core (106).

10. The spool body (100) of claim 1, wherein the plurality of spines (104) and the at least one channel (108) are disposed radially about a longitudinal axis of the core (106).

11. A method of forming a vibrating densitometer, with the method comprising:
   providing a vibrating tube portion having a predetermined natural frequency range;
   forming a spool body having a cantilever mode comprising a frequency range that is outside the predetermined natural frequency range of the vibrating tube portion;
   wherein the step of forming the spool body comprises:
      forming a core;
      forming a plurality of spines that emanate distally from the core;
      forming at least one channel defined by the plurality of spines; and
      placing a potting in the at least one channel, wherein the potting couples at least two spines of the plurality of spines, and wherein the potting placed in the at least one channel adjusts the modulus of elasticity of the spool body without altering the plurality of spines.

12. The method of claim 11, wherein the predetermined natural frequency range is between about 770 Hz and 4080 Hz.

13. The method of claim 11, wherein the predetermined natural frequency range is between about 900 Hz and 2000 Hz.

14. The method of claim 11, wherein the potting comprises a fiber.

15. The method of claim 11, wherein the potting comprises a plastic.

16. The method of claim 11, wherein the potting comprises polyphenylene sulfide.

17. The method of claim 11, wherein the step of forming the spool body comprises:
   placing a driver on the spool body, wherein the driver is configured to vibrate the vibrating tube portion; and
   placing at least one vibration sensor on the spool body, wherein the at least one vibration sensor is configured to detect vibrations of the vibrating tube portion.

18. The method of claim 11, comprising the step of placing the vibrating tube portion at least partially within a vibrating member of the vibrating densitometer.

19. The method of claim 11, wherein the plurality of spines and the at least one channel are disposed circumferentially about the core.

20. The method of claim 11, wherein the plurality of spines and the at least one channel are disposed radially about a longitudinal axis of the core.

* * * * *